(12) United States Patent
Droscher et al.

(10) Patent No.: US 11,448,322 B2
(45) Date of Patent: Sep. 20, 2022

(54) MAINTENANCE-FRIENDLY MECHANICAL SEAL

(71) Applicant: EagleBurgmann Germany GmbH & Co. KG, Wolfratshausen (DE)

(72) Inventors: Peter Droscher, Geretsried (DE); Hans Steigenberger, Eurasburg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 5 days.

(21) Appl. No.: 17/050,893

(22) PCT Filed: Mar. 11, 2019

(86) PCT No.: PCT/EP2019/055968
§ 371 (c)(1),
(2) Date: Oct. 27, 2020

(87) PCT Pub. No.: WO2019/211030
PCT Pub. Date: Nov. 7, 2019

(65) Prior Publication Data
US 2021/0231219 A1    Jul. 29, 2021

(30) Foreign Application Priority Data
Apr. 30, 2018 (DE) .................... 10 2018 206 652.3

(51) Int. Cl.
*F16J 15/34* (2006.01)
(52) U.S. Cl.
CPC ................. *F16J 15/3464* (2013.01)
(58) Field of Classification Search
CPC ......... F16J 15/34; F16J 15/3464; F16J 15/348
See application file for complete search history.

(56) References Cited

U.S. PATENT DOCUMENTS 3,841,642 A * 10/1974 Kirker, Jr. ............. F16J 15/38
                                                        277/373
4,586,719 A     5/1986 Marsi et al.
(Continued)

FOREIGN PATENT DOCUMENTS

CN      107208806 A    9/2017
EP        0177161 A1   4/1986

OTHER PUBLICATIONS

International Search Report issued in PCT/EP2019/055968, dated Jun. 17, 2019.

(Continued)

*Primary Examiner* — Gilbert Y Lee
(74) *Attorney, Agent, or Firm* — Locke Lord LLP; Scott D. Wofsy; Michael J. Pollack (57) ABSTRACT

The invention relates to a mechanical seal arrangement comprising a mechanical seal (10) including a rotating slide ring (2) and a stationary slide ring (3), defining a seal gap (4) therebetween, a one-piece, ring-shaped slide ring carrier (5), which holds the stationary slide ring (3), a one-piece, ring-shaped cover (6), which is arranged on the slide ring carrier (5), a one-piece, ring-shaped housing (7), which is detachably fixed to the cover (6) using fixing device (8), and a one-piece first retaining ring (9), which is detachably arranged on the slide ring carrier (5), wherein the stationary slide ring (3) is clamped between the first retaining ring (9) and the cover (6), and wherein the slide ring carrier (5) is connected to the slide ring carrier (5) by means of at least one elastic biasing member (19) such that the slide ring carrier (5) can perform movements in the axial direction of the mechanical seal arrangement together with the stationary slide ring (3).

10 Claims, 6 Drawing Sheets

(56) References Cited

U.S. PATENT DOCUMENTS

| | | | | |
|---|---|---|---|---|
| 4,605,235 A | * | 8/1986 | Sundberg | F16J 15/3464 |
| | | | | 277/306 |
| 4,722,534 A | * | 2/1988 | Wentworth | F16J 15/3464 |
| | | | | 277/306 |
| 5,072,948 A | * | 12/1991 | Kostrzewski | B23Q 11/10 |
| | | | | 277/320 |

OTHER PUBLICATIONS

Chinese Office Action dated Feb. 8, 2022, issued during the prosecution of PCT International Patent Application No. PCT 2019/80029104.6.

* cited by examiner

MAINTENANCE-FRIENDLY MECHANICAL SEAL

CROSS-REFERENCE TO RELATED APPLICATIONS

This application is a U.S. National Phase Application filed under 35 U.S.C. § 371, based on International Patent Application No. PCT/EP2019/055968, filed Mar. 11, 2019, which claims priority to German Patent Application No. 10 2018 206 652.3, filed on Apr. 30, 2018. The entire contents of these applications is incorporated herein by reference.

The present invention relates to a maintenance-friendly mechanical seal where replacement of slide rings is performed quick and easy. Especially, the present invention relates to mechanical seals for sealing very large shafts, especially with a diameter of greater than or equal to 0.5 m, especially for machines in power plants, wherein the shaft to be sealed is vertically arranged.

Mechanical seals are known from state of the art in various configurations. For example, one field of application of such mechanical seals is in power plants for sealing pumps or turbines or the like, where shaft diameters between 0.5 m and more than 1 m are to be sealed. These large diameters inevitably result in that the mechanical seals are of very high weight. Hence, slide rings, slide ring carriers and housing parts so far have been designed in multiple parts, to allow easy assembling. This multiple part design results in increased assembly work, as the respective parts have to be assembled on-site. This also applies if the slide rings have to be replaced, as the multiple part design of all components greatly increases disassembling work as well. However, this results in unwanted downtimes in the power plants, whereas power plant operators have a great interest in keeping downtimes as short as possible.

Therefore, it is the object of the present invention to provide a mechanical seal arrangement, especially for use as a seal for very large shafts, which allows rapid assembly as well as disassembly, due to simple design and simple, low-cost manufacturability. Furthermore, it is the object of the present invention to provide a machine, especially a pump or a turbine having a large shaft diameter of especially greater than or equal to 0.5 m including a mechanical seal arrangement according to the invention.

This object will be solved by providing a mechanical seal arrangement having the characteristics of claim 1 and a machine having the characteristics of claim 10. The respective subclaims will reveal preferred embodiments of the invention.

The mechanical seal arrangement according to invention having the characteristics of the claim 1 is advantageous in that assembling as well as disassembling operations are to be performed in a very simple and fast manner. Especially, there are only some of the components of the mechanical seal which are required to be removed and the slide rings can be replaced. Thus, the mechanical seal arrangement according to the invention is very easy to maintain and can reduce subsequent costs, especially as replacement of slide rings might be required after a certain runtime. According to the invention, this will be achieved by providing a mechanical seal in the mechanical seal arrangement, the mechanical seal having one rotating and one stationary slide ring, which define a seal gap between their sliding surfaces. Furthermore, a slide ring carrier is provided which holds the stationary slide ring. The slide ring carrier is of a one-piece and ring-shaped design. In addition, a one-piece ring-shaped cover is provided, which is mounted to the slide ring carrier. Moreover, a one-piece ring-shaped housing is detachably fixed to the cover using a fixing device. Furthermore, a one-piece first retaining ring is provided, which is detachably mounted to the slide ring carrier. The stationary slide ring is clamped between the first retaining ring and the slide ring carrier. Furthermore, the slide ring carrier is connected to the cover using at least one elastic biasing member, such that the slide ring carrier may perform movements in the axial direction of the mechanical seal together with the stationary seal ring. In this way, shaft impacts or the like can be compensated by the mechanical seal without causing damage to the sliding surfaces of the slide rings.

Preferably, the fixing device comprises a washer and a screw bolt, wherein the washer is passed through a through slot in the housing and is inserted into a groove-shaped slot in the cover and is fixed by means of the screw bolt. This allows quick and easy detaching and reattaching the ring-shaped housing to the ring-shaped cover. The fixing device preferably comprises at least one locking bolt which is used to secure the washer to the ring-shaped housing. Preferably a plurality of fixing devices are arranged along the circumference of the ring-shaped housing.

According to another preferred embodiment of the present invention, the stationary slide ring comprises a clamping area projecting outwards in a radial and entirely circumferential manner in the circumferential direction. At the clamping area, the stationary slide ring is clamped between the first retaining ring and the slide ring carrier.

Further preferably, the rotating slide ring is clamped between a shaft sleeve, which is mounted on the shaft to be sealed, and a second retaining ring. Preferably, the rotating slide ring comprises a clamping area projecting outwards in a radial and entirely circumferential manner in the circumferential direction, at which clamping area the rotating slide ring is clamped between the second retaining ring and the shaft sleeve. Preferably, the shaft sleeve is U-shaped in cross section and at least partially accommodates the rotating slide ring between its legs.

Preferably the clamping areas of the rotating and/or stationary slide rings are clamped between two O-rings. This prevents the clamping areas of the slide rings from being damaged by the clamping process, as the O-rings perform an elastic deformation during the clamping process, thus protecting the clamping areas and the seal rings.

A particularly low-cost and easy-to-assemble and disassemble design is achieved if the ring-shaped housing is preferably designed as a hollow cylinder.

Preferably, a maximum outside diameter of the cover is smaller than a minimum inside diameter of the housing. This ensures that axial movement of the housing in relation to the cover is allowed to enable simple and quick disassembling or assembling.

Preferably, the rotating slide ring has a clamping area on one side surface, which completely circumferentially projects from the side area. A first and second O-ring made of an elastic material is arranged at the clamping area. The first and second O-ring serve as bearing points for the rotating seal ring, so that the rotating slide ring is elastically supported. Herein, the first O-ring is connected to a rotating component, especially a shaft sleeve. The second O-ring is connected to a separate component, especially a retaining ring.

Further preferably, the stationary slide ring is designed in the same way as the rotating slide ring, having a clamping area. This design also allows a first O-ring to seal against a cover and a second O-ring to seal against a retaining ring.

The clamping area on the rotating slide ring and/or the clamping area on the stationary slide ring are preferably arranged at a region of the side surface which is arranged closer to a back side of the slide ring than to a sliding surface. Preferably, the clamping area on the rotating and/or stationary slide ring is located in an area of one half, preferably one third, of the length of the slide ring in the axial direction, starting from the sliding surface of the slide ring facing away from the seal gap of the mechanical seal.

Further preferably, the elastic biasing members are a plurality of springs.

Further preferably, the mechanical seal arrangement is vertically oriented, i.e. the mechanical seal arrangement seals against a vertically arranged shaft.

Furthermore, the present invention relates to a machine, especially a pump or a turbine comprising a shaft to be sealed having a diameter of greater than or equal to 0.5 m, and a mechanical seal arrangement according to the invention. Preferably, the shaft of the machine is vertically arranged.

In the following, an example embodiment of the invention will be described in detail while making reference to the accompanying drawing, wherein.

Referring now to FIGS. 1 to 6, a mechanical seal arrangement 1 is described in detail below according to a first preferred example embodiment of the invention.

Figure 1:
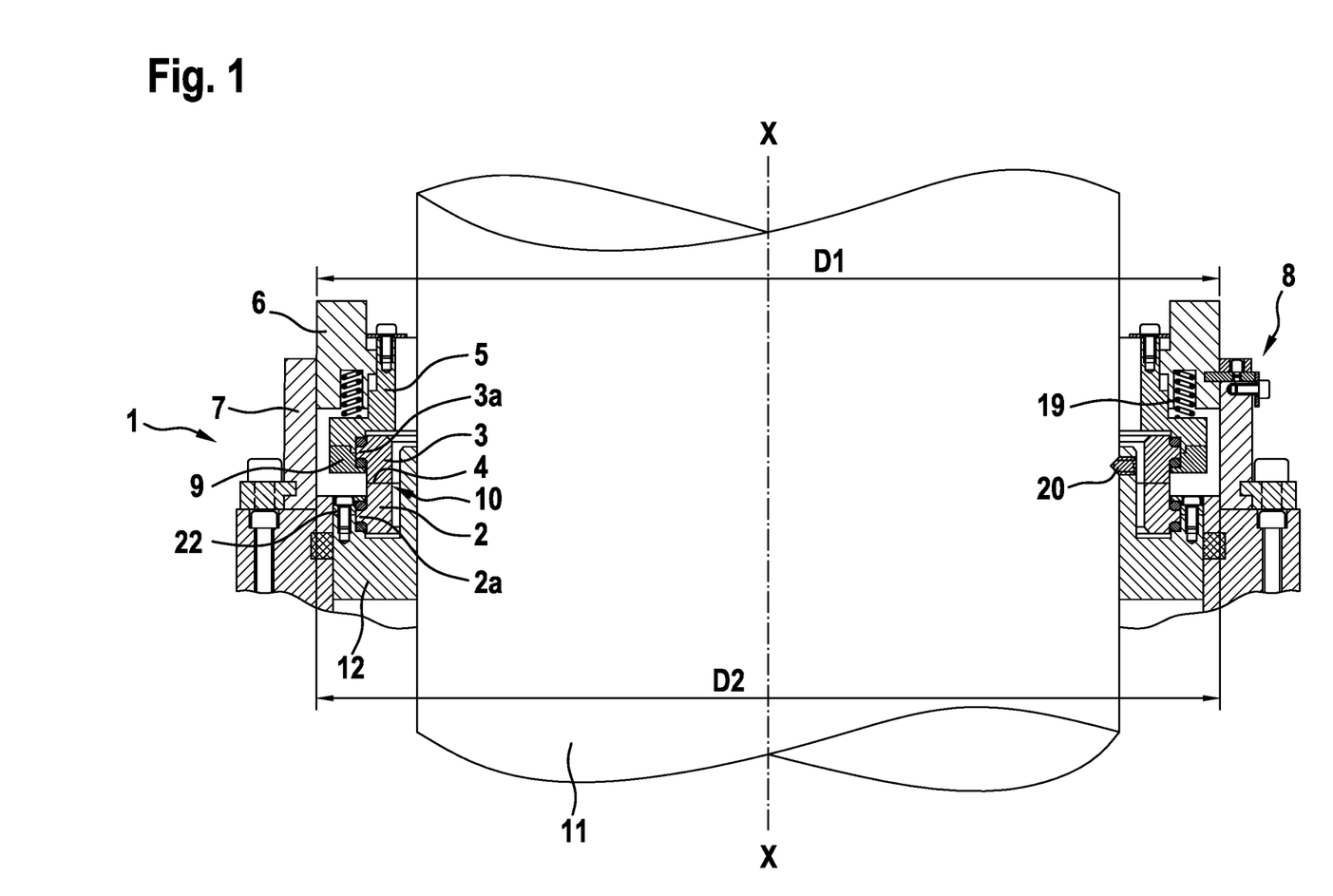
FIG. 1 is a schematic section view of a mechanical seal arrangement according to an example embodiment of the invention.

As may schematically be seen from FIG. 1, the mechanical seal arrangement 1 seals at a shaft 11. The shaft 11 is arranged in the vertical direction. Thus, a central axis X-X of the mechanical seal arrangement 1 is also aligned in the vertical direction.

The mechanical seal arrangement 1 comprises a mechanical seal 10 with a rotating slide ring 2 and a stationary slide ring 3, which have sliding surfaces facing to each other and having defined a seal gap 4 therebetween. As can be seen from FIG. 1, the rotating slide ring 2 is arranged on a shaft sleeve 12, which is directly fixed on a shaft 11 using a number of worm screws 20.

The stationary slide ring 3 is held by a one-piece, ring-shaped slide ring carrier 5. A one-piece, ring-shaped cover 6 is arranged on the slide ring carrier 5. Furthermore, the mechanical seal arrangement comprises a one-piece, ring-shaped housing 7, which is detachably fixed to the cover 6 by means of a fixing device 8 (see FIG. 2).

Thus, the mechanical seal arrangement 1 comprises three one-piece, ring-shaped components, namely the mechanical seal carrier 5, the cover 6 and the housing 7. The one-piece, ring-shaped design of these three components allows easy and safe assembling and disassembling due to the reduced number of components.

As can be seen from FIG. 1, a maximum outside diameter D1 of the cover 6 is smaller than a minimum inside diameter D2 of the housing 7, thus providing an axially telescopic arrangement between the cover 6 and the housing 7.

Figure 2:
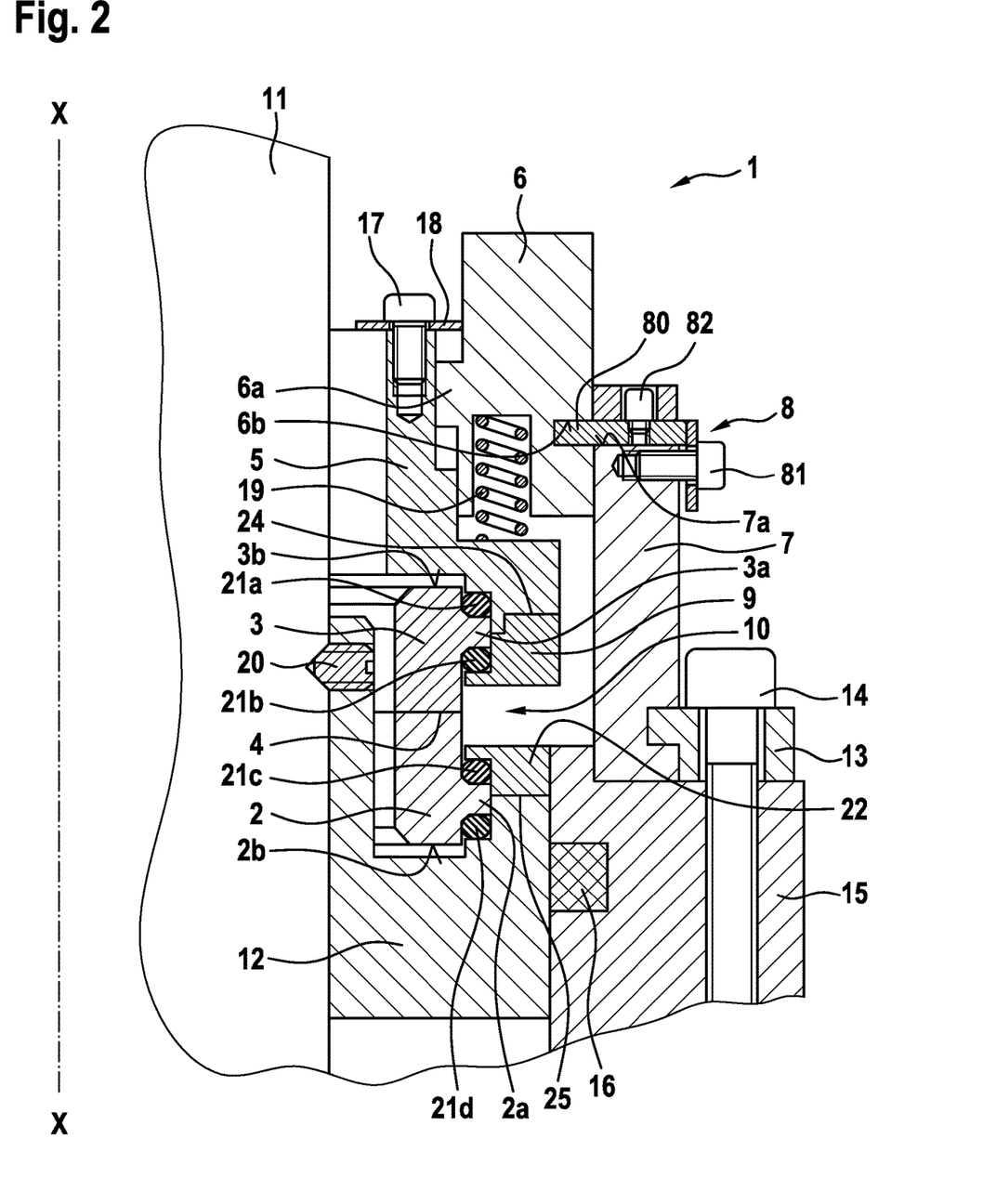
FIG. 2 is an enlarged partial section view of the mechanical seal arrangement of FIG. 1.
Figure 3:
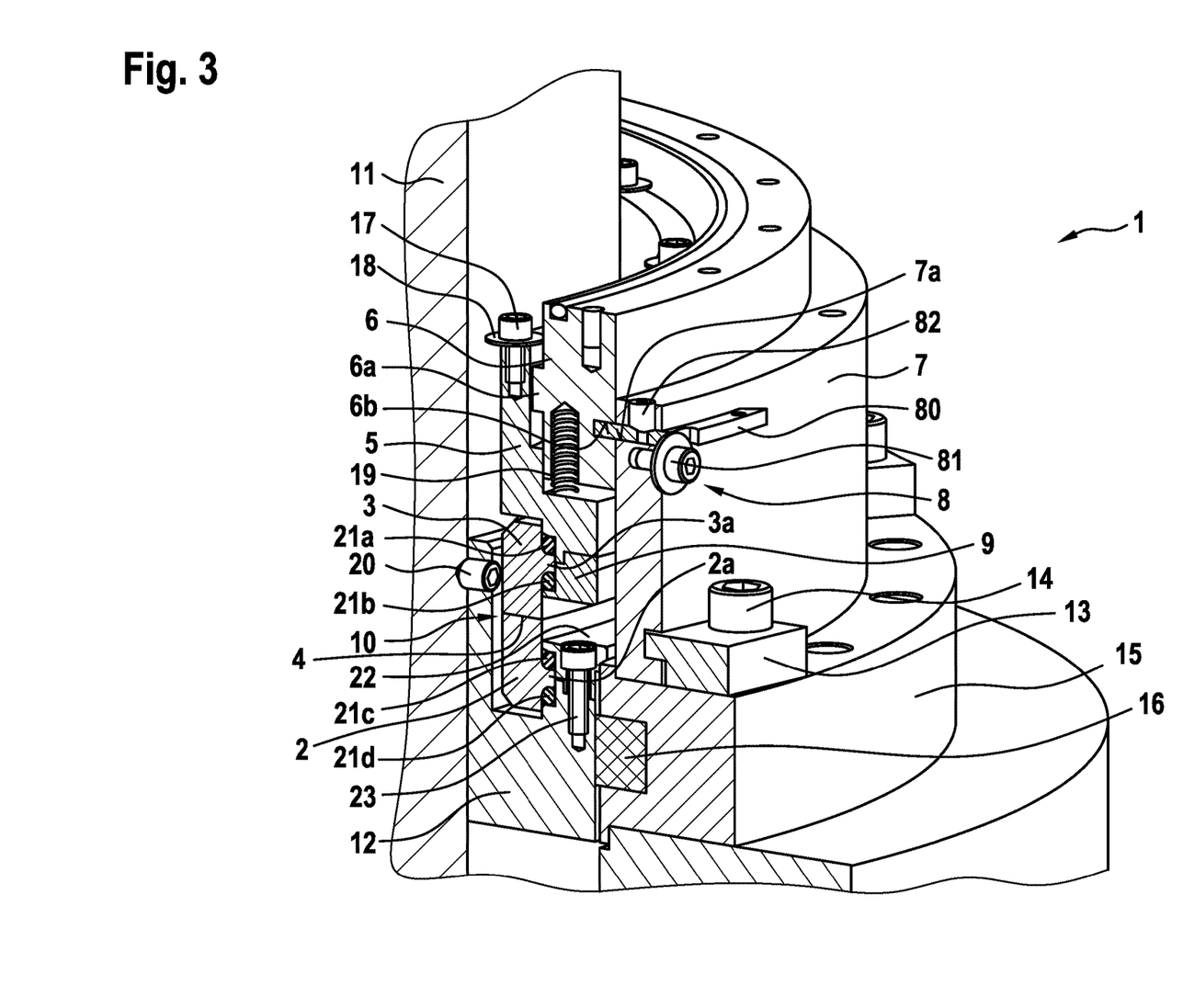
FIG. 3 is a schematic, perspective section view of the mechanical seal arrangement of FIG. 1.

As can be seen in particular from FIGS. 2 and 3, a large number of biasing members 19 in the form of cylindrical springs are provided between the cover 6 and the housing 7. The cylindrical springs bias the stationary slide ring 3 against the rotating slide ring 2. Furthermore, the biasing members 19 enable the stationary slide ring 3 to move in the direction of the center axis X-X towards the cover 6 together with the slide ring carrier 5 when deflecting the shaft in order to compensate for such shaft deflections.

To avoid damage to the components, a stop is provided on the slide ring carrier 5. The stop comprises a large number of stop pins 17 including stop washers 18, which limit axial movement while making use of a circumferential projection 6a on the cover 6 surrounding the inner circumference.

As can especially be seen from FIG. 3, the stationary slide ring 3 is detachably attached to the slide ring carrier 5 using a one-piece, first retaining ring 9.

For allowing secure fastening, the stationary slide ring 3 comprises a clamping area 3a, which is circumferentially provided in a ring-shaped manner at one side surface of the stationary slide ring 3. The clamping area 3a is located closer to a back side 3b of the stationary slide ring 3. The clamping area 3a is clamped between a first O-ring 21a on the slide ring carrier 5 and a second O-ring 21b on the first retaining ring 9. A gap 24 between the slide ring carrier 5 and the first retaining ring 9 leads to the clamping area 3a.

Similarly, the rotating slide ring 2 also comprises a clamping area 2a, which projects at a radial outer circumference and is designed to be fully circumferential in the circumferential direction. The clamping area 2a of the rotating slide ring 2 is also clamped between two O-rings 21c, 21d. Herein, the O-ring 21c is in contact with a second retaining ring 22 and the O-ring 21d is in contact with the shaft sleeve 12. A gap 25 leads to the clamping area 2a of the rotating seal ring.

As can be seen in particular from FIG. 2, the clamping area 2a of the rotating slide ring 2 is also located closer to a back side 2b of the rotating slide ring 2 than to a sliding surface of the rotating slide ring 2.

FIG. 3 schematically shows a clamping bolt 23 which fixes the second retaining ring 22 to the shaft sleeve 12. As can be seen from FIGS. 3, 4 and 5, the fixing device 8 comprises a number of washers 80 and bolts 81 attaching the ring-shaped housing 7 to the ring-shaped cover 6. The ring-shaped housing 7 has a through slot 7a and the ring-shaped cover 6 has a groove-shaped slot 6b. The washer 80 is passed through the through slot 7a and is inserted into the arc-shaped, groove-shaped slot 6b in the cover 6 (see FIG. 5). As can be seen from FIG. 4, a large number of fixing devices 8 are provided along the circumference to enable secure fixing of the housing 7 to the cover 6.

The fixing device 8 is secured by means of a safety pin 82, which is shown in FIG. 3. The safety bolt 82 secures the washer 80 perpendicular to a washer plane.

For sealing between the seal housing 15 and the shaft sleeve 12, a circumferential elastomer seal 16 is arranged (see FIG. 2).

Figure 4:
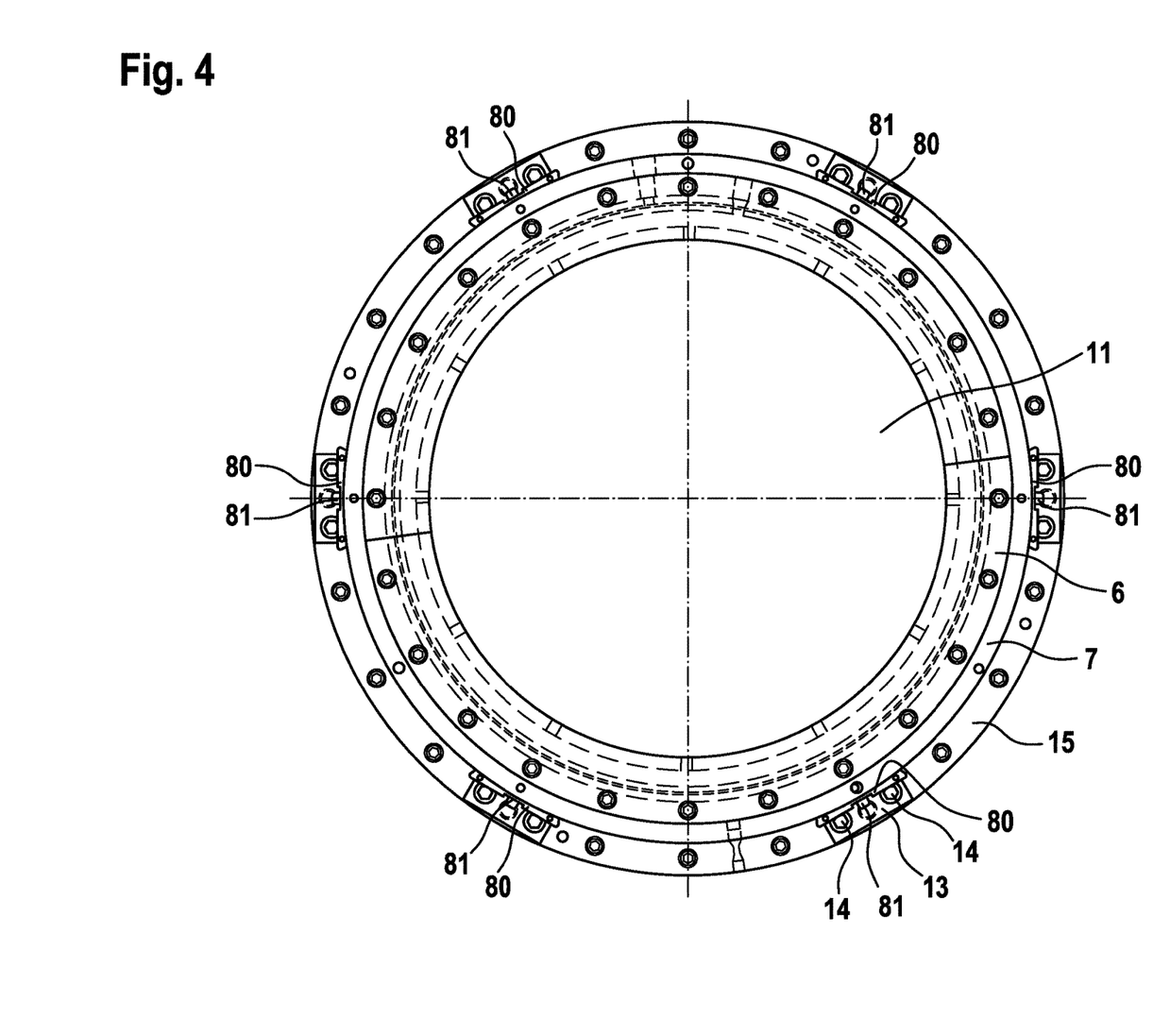
FIG. 4 is a schematic plan view of the mechanical seal arrangement of FIG. 1 in the axial direction.
Figure 5:
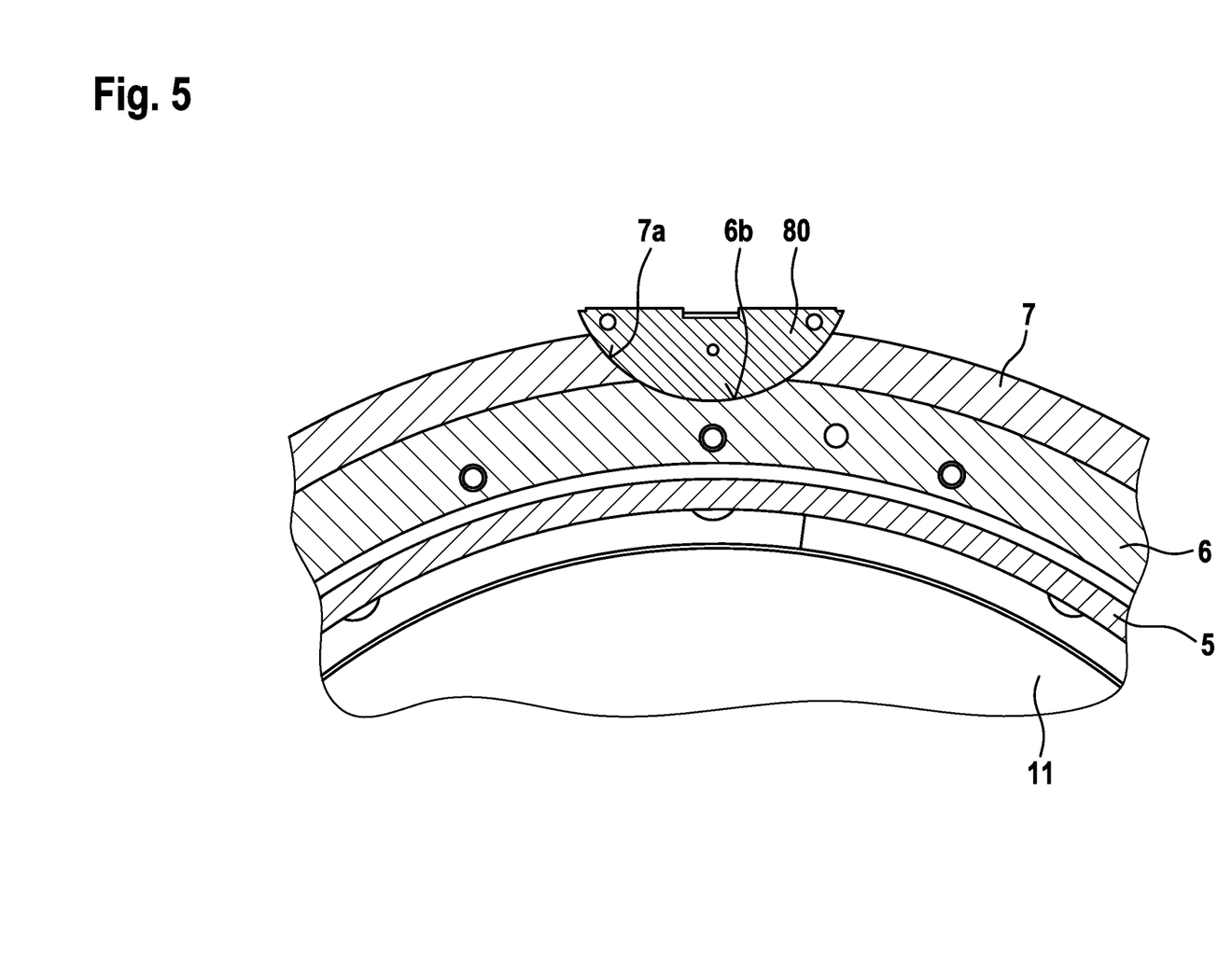
FIG. 5 is a schematic section view of a fixing device between the cover and the housing.

In addition, the ring-shaped housing 7 is fixed to a seal housing 15 of the machine, e.g. a pump or turbine, using a clamping claw 13 and a clamping bolt 14. A large number of clamping claws 13 and clamping bolts 14 are also provided along the circumference. As shown in FIG. 4, each clamping claw 13 is fixed to the seal housing 15 by means of two clamping bolts 14.

Thus, according to the invention, a mechanical seal arrangement 1 can be provided which comprises a one-piece rotating slide ring 2 and a one-piece stationary slide ring 3.

Furthermore, a one-piece slide ring carrier 5 is provided to hold the stationary slide ring 3, a one-piece cover 6 and a one-piece housing 7. The housing 7 can easily and economically be manufactured, preferably as a hollow cylinder. The one-piece design of the three components, especially the slide ring carrier 5, the cover 6 and the housing 7, greatly facilitates both assembling and disassembling.

Figure 6:
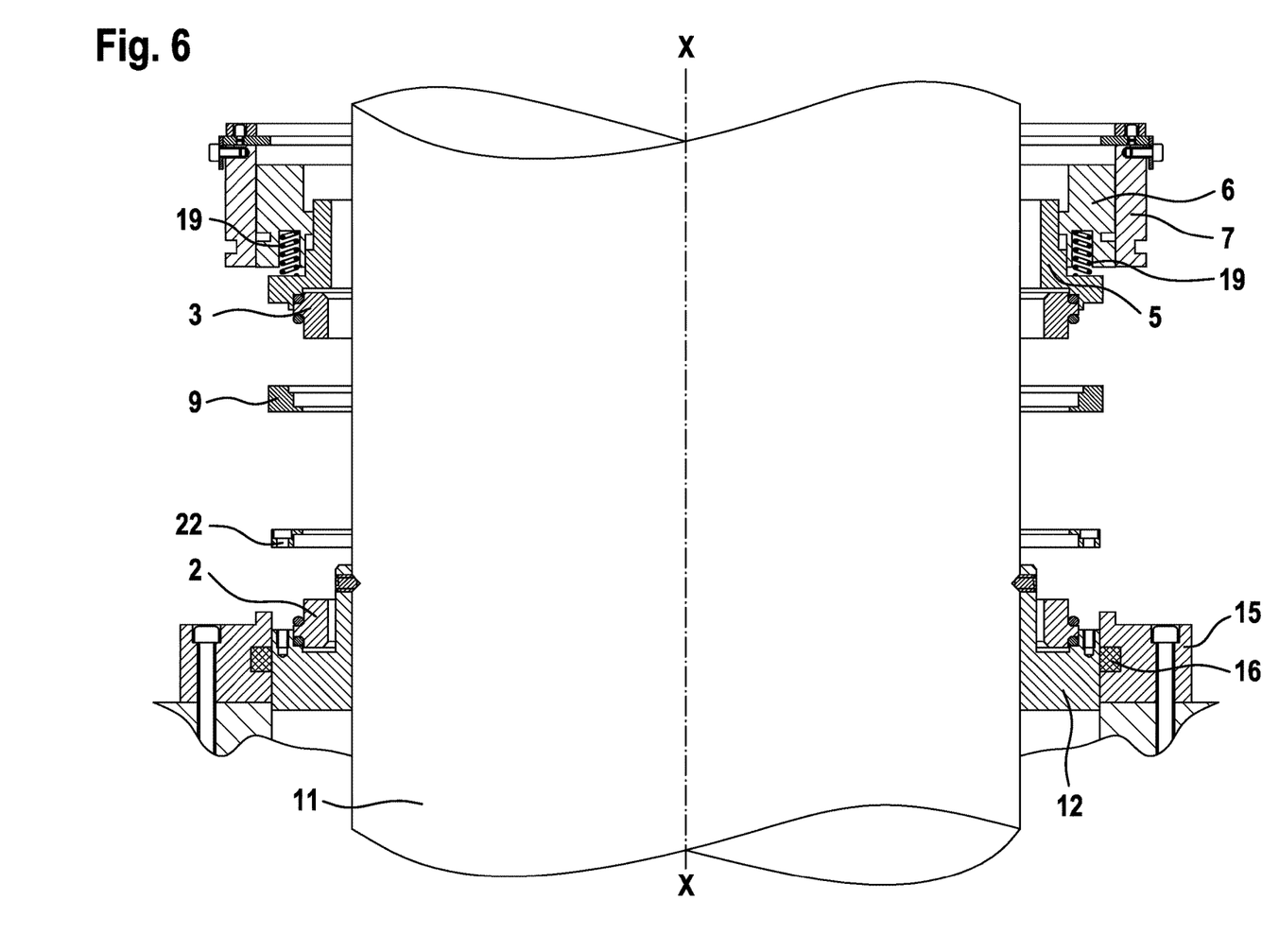
FIG. 6 is a schematic section view of a disassembling procedure of the mechanical seal arrangement of FIG. 1.

FIG. 6 shows a schematic disassembling process. The slide rings 2, 3 can be replaced without requiring complete disassembling the slide ring carrier 5, the cover 6 and the ring-shaped housing 7. The three components of the slide ring carrier 5, the cover 6 and the housing 7 may be left loosely arranged in the axial direction above the shaft 11 and held in position, for example, using an auxiliary device not shown. Disassembling will then be performed by first loosening the clamping claws 13, allowing the housing 7 to be lifted off the seal housing 15 together with the cover 6.

The slide ring carrier 5 is also lifted in this process, wherein the stationary slide ring 3, which is attached to the slide ring carrier 5 by means of the first retaining ring 9, will also be lifted at the same time. Then, the first retaining ring 9 is released from the slide ring carrier 5, as shown in FIG. 6. Thus, the stationary slide ring 3 will be exposed.

As all components remain arranged around the shaft 11, the stationary slide ring 3 is required to be destroyed to completely remove it. Subsequently, only a stationary slide ring 3 can be inserted as a spare part, which is provided as a so-called split ring. Preferably, two ring halves, each having a circumferential length of 180°, are provided herein, which can be inserted into the slide ring carrier 5 and then be fixed to the slide ring carrier 5 again by means of the first retaining ring 9.

The rotating slide ring 2 can also be replaced very easily by simply removing the second retaining ring 22 from the shaft sleeve 12 so that the rotating slide ring 2 is exposed. This state is shown in FIG. 6. Then the rotating slide ring 2 is also to be destroyed and can only be replaced by a split rotating slide ring. This is also preferably provided by means of two rotating slide ring parts which each surround by 180°.

Reassembly is performed in reverse order, i.e. first, the rotating slide ring 2 is replaced and the new rotating slide ring 2 is fixed to the shaft sleeve 12 using the second retaining ring 22. Then, the stationary slide ring 3 is replaced and fixed to the slide ring carrier 5 using the first retaining ring 9. The housing 7 will subsequently be fixed to the seal housing 15 using the clamping claws 13 and the housing 7 is secured by means of the washer 80. Replacement of the seal rings will thus be completed.

According to the present invention, the previously used very bulky multi-part housing may be replaced and especially may avoid the requirement of complete disassembling the housing and the retaining components of the stationary slide ring, when replacing the seal rings. Furthermore, the machine can be equipped with undivided seal rings for the first time, but when replacing, the seal rings are always required to be replaced by means of divided seal rings. As the slide ring carrier 5, the cover 6 and the housing 7 are of a one-piece design, there is no need for a time-consuming disassembly of these components, thus eliminating the requirement of a large number of disassembling and assembling steps. Another major advantage of the one-piece design of the slide ring carrier 5, the cover 6 and the housing 7 according to the invention resides in that susceptibility to failure will be eliminated due to component tolerances of the multiple part design. Thus, especially in the case of high-load seal rings in power plants, fast and safe replacement can be achieved without the requirement of long downtimes in the power plant.

LIST OF REFERENCE NUMBERS 1 mechanical seal arrangement
2 rotating slide ring
2a clamping area
2b back side
3 stationary slide ring
3a clamping area
3b back side
4 seal gap
5 slide ring carrier
6 cover
6a projection
6b groove-shaped slot
7 ring-shaped housing
7a through slot
8 fixing device
9 first retaining ring
10 mechanical seal
11 shaft
12 shaft sleeve
13 clamping claw
14 biasing bolt
15 seal housing
16 elastomer seal
17 stop pin
18 stop washer
19 biasing member
20 worm screw
21a, b, c, d O ring
22 second retaining ring
23 clamping bolt
24, 25 gap
80 washer
81 screw bolt
82 safety pin
D1 maximum outside diameter
D2 minimum inside diameter of the housing
X-X central axis

The invention claimed is:

1. A mechanical seal arrangement comprising:
a mechanical seal comprising a rotating slide ring and a stationary slide ring-defining a seal gap therebetween,
a one-piece, ring-shaped slide ring carrier which holds the stationary slide ring,
a one-piece, ring-shaped cover, which is arranged on the slide ring carrier,
a one-piece, ring-shaped housing, which is detachably fixed to the cover by means of a fixing device, and
a one-piece first retaining ring, which is detachably arranged on the slide ring carrier,
wherein the stationary slide ring is clamped between the first retaining ring and the seal ring carrier,
wherein the slide ring carrier is connected to the cover by means of at least one elastic biasing element such that the slide ring carrier can perform movements in the axial direction of the mechanical seal arrangement together with the stationary slide ring, and
wherein a maximum outside diameter of the cover is smaller than a minimum inside diameter of the housing.

2. The mechanical seal arrangement according to claim 1, wherein the fixing device comprises a washer, said washer being inserted and fixed through a through slot in the housing and in a groove-shaped slot in the cover.

3. The mechanical seal arrangement according to claim 1, wherein the stationary slide ring comprises a first clamping area projecting outwards in a radial and circumferential manner at which the stationary slide ring-is clamped between the first retaining ring and the seal ring carrier.

4. The mechanical seal arrangement according to claim 3, wherein two O-rings abut the first clamping area of the stationary slide ring.

5. The mechanical seal arrangement according to claim 4, wherein the first clamping area is disposed on a side surface of the stationary slide ring, and the first clamping area is disposed closer to a rear surface than a sliding surface of the stationary slide ring in an axial direction of the mechanical seal arrangement.

6. The mechanical seal arrangement according to claim 1, wherein the rotating slide ring-is clamped between a shaft sleeve and a second retaining ring.

7. The mechanical seal arrangement according to claim 6, wherein the rotating mechanical ring comprises a second clamping area projecting outwards in a radial and circumferential manner at which the rotating mechanical ring is clamped between the shaft sleeve and the second retaining ring.

8. The mechanical seal arrangement according to claim 6, wherein two O-rings abut the second clamping area of the rotating slide ring.

9. The mechanical seal arrangement according to claim 8, wherein the second clamping area is disposed on a side surface of the rotating slide ring, and the second clamping area is disposed closer to a rear surface than to a sliding surface of the rotating slide ring in an axial direction of the mechanical seal arrangement.

10. A machine comprising a mechanical seal arrangement according to claim 1.

* * * * *